Figure 1:
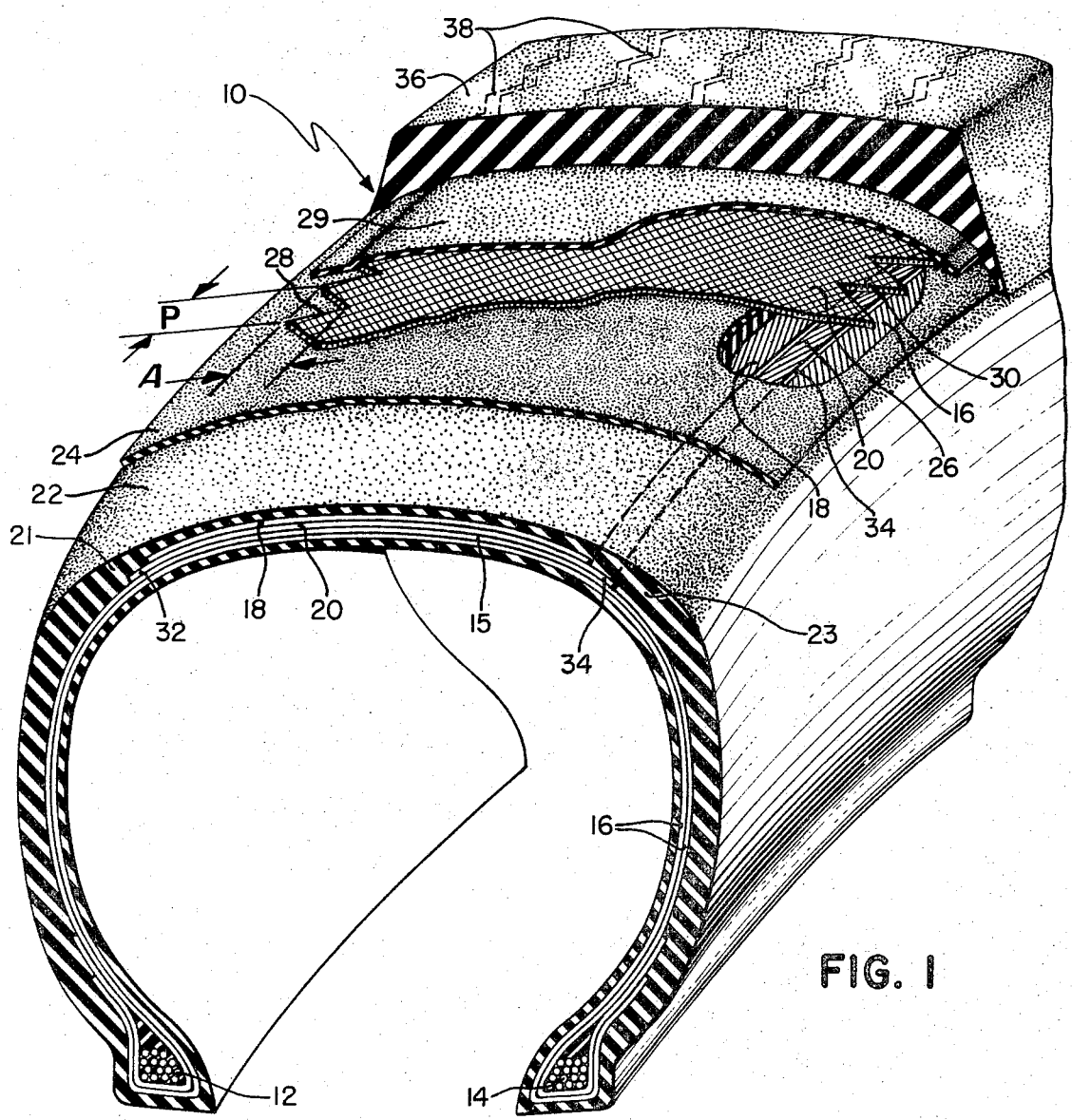

United States Patent [19]
Paulin et al.

[11] 3,841,376
[45] Oct. 15, 1974

[54] PNEUMATIC TIRE AND METHOD OF RETREADING

[75] Inventors: Kenneth H. Paulin, Tallmadge; Merritt W. Wolfe, Akron, both of Ohio

[73] Assignee: The Goodyear Tire & Rubber Company, Akron, Ohio

[22] Filed: Jan. 2, 1973

[21] Appl. No.: 320,218

[52] U.S. Cl. ............................. 152/361 R, 156/96
[51] Int. Cl. ............................................. B60c 9/18
[58] Field of Search ............ 152/361 R, 209 R, 187, 152/188, 175, 176; 156/96, 98, 123

[56] References Cited
UNITED STATES PATENTS

| | | | |
|---|---|---|---|
| 1,607,266 | 11/1926 | Lough | 152/361 R |
| 3,136,673 | 6/1964 | Carver | 152/209 R |
| 3,558,383 | 1/1971 | Lejeune | 156/96 |
| 3,719,218 | 3/1973 | Leybourne | 152/361 R |

*Primary Examiner*—M. Henson Wood, Jr.
*Assistant Examiner*—George H. Libman
*Attorney, Agent, or Firm*—F. W. Brunner; M. L. Gill

[57] ABSTRACT

A method of retreading a bias belted pneumatic tire which includes preparing the tire to receive a new tread, applying a layer of vulcanizable elastomeric material to the tire, wrapping a layer of square woven nylon having dentate lateral edges circumferentially about the tire with each dentate configuration extending from a point axially inwardly of to a point axially outwardly of the edge of the belt structure on the tire, providing tread stock circumferentially about the fabric and vulcanizing the tire under heat and pressure.

9 Claims, 2 Drawing Figures

PNEUMATIC TIRE AND METHOD OF RETREADING

The foregoing abstract is not to be taken as limiting the invention of this application, and in order to understand the full nature and extent of the technical disclosure of this application, reference must be made to the accompanying drawing and the following detailed description.

This invention relates to pneumatic tires and more particularly to a method of providing a new tread surface on used pneumatic tires.

In recent years belted tires including bias belted tires and radial ply tires, which characteristically exhibit good traction and wear properties, have become increasingly popular with motorists. Further, tires in recent years are being subjected to increased speeds and loads. The addition of belt structures and other components in the high flex are beneath the tread as well as increased loads and speeds make it increasingly more difficult to provide a new tread surface on a worn tire that will have sufficient resistance to penetration, and separation between various old components and the new tread portion.

An object of the present invention, therefore, is to provide a pneumatic tire, particularly a retreaded tire, having increased resistance to penetration in the tread area as well as good durability particularly with regard to reinforcing structures located beneath the tread.

It is a further object of the present invention to provide a method of retreading a tire that will result in the retreaded tire having good resistance to penetration in the tread area as well as durability particularly with regard to component separation beneath the tread area.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

IN THE DRAWING

Figure 2:
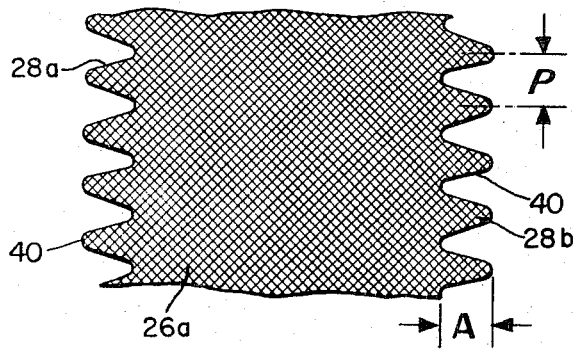

FIG. 1 is a sectional perspective view of a tire illustrating the method of the present invention; and, FIG. 2 is a plan view of an alternate reinforcing layer configuration used in conjunction with the present invention.

With reference to FIG. 1, there is illustrated a passenger car tire 10 which has been prepared for retreading. The tire includes a pair of annular inextensible bead portions 12 and 14, a pair of body plies 16 extending circumferentially about the tire 10 and from bead portion 12 to bead portion 14. A belt structure 15, including a pair of reinforcing layers or plies 18 and 20, extends circumferentially about the body plies 16 and are located beneath what was the tread area or non-skid portion of the tire 10 when it was new. The belt structure terminates in axial directions in the shoulder regions 21, 23 of the tire 10.

The particular tire illustrated is a bias belted tire. A bias belted tire is one in which the continuous cords in the body ply 16 extend at an angle of between 25° and 45° with respect to the mid-circumferential centerline of the tire at the mid-circumferential centerline. The mid-circumferential centerline is a circle having the rotational axis of the tire as its center and lying midway between the lateral edges of the tread. The belt structure in the bias belted tire provides circumferential restriction in the area of the tread such that the inflated diameter of the tire is less than it would have been were the belt structure not present.

As seen in FIG. 1, the worn tread portion has been buffed away to leave a fairly rough evenly contoured surface 22 to receive new tread components. A layer 24 of vulcanizable gum rubber or other suitable elastomeric material is provided circumferentially about the tire 10 and extends substantially to the axially outer edges of the buffed area to provide a good bond between the old tire carcass and the new components.

A reinforcing layer of cord fabric 26 is coated or impregnated with a vulcanizable elastomeric material and then wrapped circumferentially about the tire. The reinforcing layer of fabric 26 is made of square woven nylon and has its axially outer edges 28 and 30 formed in a dentate configuration. That is, the lateral edges 28, 30 are scalloped or undulated to provide a zig-zag or wavy pattern.

In the particular example illustrated in FIG. 1, the lateral edges 28 and 30 of the layer are of a saw-tooth configuration with the teeth extending from a point axially inwardly to a point axially outwardly of the respective edges 32 and 34 of the plies 18, 20. The scallops or undulations, therefore, are deep enough to span the lateral edges of the old belt structure 15 and cover both edges 32 or 34 of the two belt plies 18 and 20. It has been found that with respect to passenger car tires the scalloped or wavy edges should be at least ½ inch wide with the amplitude of A of the waves or saw-teeth being at least equal to three-fourths of the pitch distance P between the teeth. The pitch distance P should be at least ⅝ of an inch.

If desired, an additional layer of gum rubber or elastomeric material 29 can be applied over the reinforcing layer 26. Vulcanizable tread rubber 36 is then applied circumferentially about the tire by any suitable process such as continuously wrapping a narrow ribbon of rubber around the tire in a plurality of turns until the desired cross-sectional contour is developed. The tread rubber 36 may also be applied by extruding a slab of vulcanizable rubber with the proper cross-section in one piece and then wrapping the extrudate circumferentially about the tire. The tire is then placed in a mold under heat and pressure to vulcanize the rubber parts and imprint a tread design 38 (shown in dotted lines).

It is also contemplated that the tread rubber 36 could be preformed and precured with the desired non-skid portion or pattern 38 and then wrapped circumferentially about the fabric layer 26. The tire 10 would then be heated under pressure to vulcanize the gum strips 24 and 29 and the fabric layer or ply 26 to assure a good firm bond between the new tread 36 and the old carcass.

With reference to FIG. 2, there is illustrated an additional embodiment of the reinforcing layer 26a which could be utilized in conjunction with the present invention. As seen in FIG. 2, the dentate configuration along the edges 28a and 28b is in the form of a sinuous curve or undulations 40. It will be appreciated that here again with respect to passenger car tires the amplitude A of the undulations should be at least ½ inch and equal to at least three-fourths of the pitch distance P between the nodes of the undulations. Also, as before, the pitch distance P should be at least ⅝ of an inch.

The fabric layer 26 is preferably made of square-woven nylon and arranged on the tire carcass such that the cords extend at an angle of approximately 45° with respect to the mid-circumferential centerline of the tire. Although square-woven nylon is preferred, it will be appreciated that other materials may be utilized.

Further, while the invention has been illustrated in conjunction with retreading of a bias belted tire and finds particular utility in that area, it is not intended that it be so limited, but rather may also be used in retreading radial ply tires, non-belted tires and in the manufacture of new tires. Further, while the specific tire illustrated is a passenger car tire, the present invention can be incorporated in larger or smaller tires and for other vehicle applications.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

What is claimed is:

1. A method of providing a new tread on a pneumatic tire of the type having a carcass and a reinforcing structure extending circumferentially about the carcass and terminating in axial directions in the shoulder areas of the tire said method comprising preparing the tread area of the tire to receive a new tread, preparing a layer of square woven cord reinforced fabric having a length greater than its width and coated with a vulcanizable elastomeric material, providing a dentate configuration along at least one of the long edges of said fabric, and wrapping said fabric circumferentially about said tire such that the dentate configuration, on at least one side thereof, extends from a point axially inwardly of to a point axially outwardly of axially outer edge of said reinforcing structure.

2. A method as claimed in claim 1 wherein said dentate configuration is provided in the form of saw teeth.

3. A method as claimed in claim 2 further including interposing a layer of vulcanizable elastomeric material between said layer of cord reinforced fabric and the prepared tread area.

4. A method as claimed in claim 3 further including applying a layer of elastomeric material circumferentially about said reinforcing layer and then subjecting the tire to heat and pressure.

5. A method as claimed in claim 3 further including providing a layer of vulcanizable elastomeric material circumferentially about said reinforcing fabric, shaping and vulcanizing the new tread on the tire under heat and pressure.

6. A tire including a used vulcanized toroidally shaped carcass and a circumferentially extending vulcanized reinforcing structure disposed circumferentially about said tire and terminating in axial directions in the area of the tire shoulder said tire being characterized by a layer of square woven cord reinforced fabric embedded in unvulcanized elastomeric material and having its outer edges in a dentate configuration said fabric extending circumferentially about said reinforcing structure, and a layer of vulcanizable elastomeric material extending circumferentially about said fabric.

7. A tire as claimed in claim 6 wherein the dentate configuration of said cord reinforced fabric extends from a point axially inwardly to a point axially outwardly of the respective lateral edges of said reinforcing structure.

8. A tire as claimed in claim 7 wherein said dentate edges are saw-tooth shaped with the amplitude of the teeth being equal to at least one-half inch and at least three-quarters of the pitch of the teeth.

9. A tire as claimed in claim 8 wherein said reinforcing fabric is made of nylon cord.

* * * * *